United States Patent [19]

Schmidt et al.

[11] Patent Number: 5,165,970

[45] Date of Patent: Nov. 24, 1992

[54] METHOD OF COATING HONEYCOMB BODIES WITH FINELY DIVIDED SOLID MATTER

[75] Inventors: Felix Schmidt, Rheinfelden; Wilfried Baumgartner, Rheinfelden; Reinhard Manner, Maintal; Gerhard Birtigh, Nidderau; Ewald Dittrich, Grosskrotzenburg, all of Fed. Rep. of Germany

[73] Assignee: Degussa Aktiengesellschaft, Frankfurt am Main, Fed. Rep. of Germany

[21] Appl. No.: 661,313

[22] Filed: Feb. 27, 1991

[30] Foreign Application Priority Data

Feb. 28, 1990 [DE] Fed. Rep. of Germany ....... 4006205
Dec. 15, 1990 [DE] Fed. Rep. of Germany ....... 4040150

[51] Int. Cl.$^5$ .............................................. C23C 26/00
[52] U.S. Cl. .................................. 427/430.1; 427/238; 427/239; 427/435; 427/443.2; 427/245; 427/247; 427/235
[58] Field of Search ................... 427/430.1, 238, 239, 427/435, 443.2, 245, 247, 235

[56] References Cited

U.S. PATENT DOCUMENTS

| | | |
|---|---|---|
| 987,450 | 3/1911 | Eichelberger et al. . |
| 1,264,511 | 4/1918 | Hechenbleikner . |
| 1,983,366 | 12/1934 | Harlow . |
| 2,012,968 | 9/1935 | Miller .................................. 427/238 |
| 2,208,646 | 7/1940 | Saunders et al. . |
| 2,497,171 | 4/1950 | Jones et al. . |
| 2,657,668 | 11/1953 | Maier . |
| 2,730,195 | 1/1956 | Roberts . |
| 2,936,042 | 5/1960 | Hodson . |
| 3,010,847 | 11/1961 | Ewing et al. ........................ 427/238 |
| 3,310,427 | 3/1967 | Cheney et al. . |
| 3,394,426 | 7/1968 | Knox . |
| 3,623,910 | 11/1971 | Calhoun et al. . |
| 3,793,802 | 2/1974 | Hardt . |
| 3,873,350 | 3/1975 | Dwyer et al. . |
| 3,948,213 | 4/1976 | Hoyer et al. . |
| 4,039,482 | 8/1977 | Hoyer et al. . |
| 4,191,126 | 3/1980 | Reed et al. . |
| 4,208,454 | 6/1980 | Reed et al. . |
| 4,311,735 | 1/1982 | Young . |
| 4,384,014 | 5/1983 | Young . |
| 4,454,177 | 6/1984 | Feist ............................. 427/430.1 X |
| 4,471,712 | 9/1984 | Voigt et al. . |
| 4,472,454 | 9/1984 | Houdayer et al. ............ 427/430.1 X |
| 4,550,034 | 10/1985 | Shimrock et al. . |
| 4,553,499 | 11/1985 | Crone, Jr. et al. . |
| 4,609,563 | 9/1986 | Shimrock et al. . |
| 4,620,991 | 11/1986 | Young ........................... 427/430.1 X |
| 4,721,516 | 1/1988 | Barsacq . |
| 4,846,894 | 7/1989 | Clem et al. . |
| 4,963,396 | 10/1990 | Ito et al. ........................ 427/430.1 X |
| 5,070,893 | 12/1991 | Dittrich et al. . |
| 5,077,093 | 12/1991 | Baumgartner et al. . |

FOREIGN PATENT DOCUMENTS

WO89/11342 11/1989 PCT Int'l Appl. .
2025034 1/1980 United Kingdom .

Primary Examiner—Shrive Beck
Assistant Examiner—Vi Duong Dang
Attorney, Agent, or Firm—Beveridge, DeGrandi & Weilacher

[57] ABSTRACT

A method for the uniform coating of honeycomb bodies with finely divided solid matter from a dispersion in an amount which is below that which arises during customary immersion. To this end, the honeycomb is flooded from below with dispersion, emptied after a dwell time and blown out. Filling time, filling amount, dwell time emptying time as well as the time between emptying and blowing out are measured in such a manner that in order to increase the separated amount of solid matter, filling time, dwell time, pumping-out time and the time between emptying and blowing out are increased but the filling amount is reduced.

22 Claims, 7 Drawing Sheets

METHOD OF COATING HONEYCOMB BODIES WITH FINELY DIVIDED SOLID MATTER

INTRODUCTION AND BACKGROUND

The present invention relates to a method for the uniform coating of a honeycomb body formed of ceramic or metal with an amount of the solid matter of a coating dispersion which amount, at a given constant density of the coating dispersion, is below that which arises under equilibrium conditions between the honeycomb body and the coating dispersion.

Up to the present invention, when coating porous ceramic carriers of the monolithic type with finely divided oxides, e.g. catalytically active $Al_2O_3$ for increasing the surface of a subsequently applied catalytically active component, the carriers were immersed in an aqueous dispersion of the oxide until the complete filling up of the cells occurred or the carriers were flooded with the dispersion. Then, the excess dispersion remaining in the cells was conventionally removed by blowing it out or by removing it by suction (Ullmanns Encyclopedia of Industrial Chemistry, 3d German edition, vol. 9 (1957), pp. 273, 274). Coatings were always created thereby in accordance with the complete saturation of the water-pore volume of the particular ceramic carrier. The known method only permits the use of relatively low-concentrated, that is, highly fluid oxide dispersions, so that multiple coatings with intermediate drying is required in order to apply an amount of oxide which is suitable for the intended purpose The amount of oxide absorbed in the individual instance per carrier is strictly related to the porosity and the absorption capacity of the carrier, so that in many carriers the resulting amounts of oxide loading vary sharply. In addition, the immersion process must be carried out so slowly that no flooding of the front surface on top occurs during immersion and with resulting inclusion of air in the monolithic honeycomb body before the rising liquid column of the dispersion reaches this front surface. If this slow process is not used, uncoated areas remain in the monolithic honeycomb body.

A technically rather expensive method described in DE-AS 25 46 489 circumvents the problem of a simple immersion of a monolithic honeycomb body by means of introducing the honeycomb body into a pressure chamber, evacuating this chamber and the honeycomb body located in it including its pores, flooding the chamber with the dispersion and building up an excess pressure in the chamber in order to force the dispersion into the pores as well as subsequently removing the excess dispersion remaining in the cells of the monolithic honeycomb body. This publication does not contain a teaching for a uniform application of desired amounts of solid matter.

An object of the invention is to overcome these disadvantages and create a coating method with which a desired amount of coating can be applied in a uniform distribution, independent of a given absorption capacity of a porous ceramic carrier or of a given adsorption action of a metallic carrier, and the scattering of the charged amounts of the coating within a carrier series can be reduced.

SUMMARY OF THE INVENTION

In achieving the above as well as other objects, a feature of the invention resides in a method for the uniform coating of a honeycomb body formed of ceramic or metal with an amount of the solid matter of a coating dispersion which amount, at a given constant density of the coating dispersion, is below that which arises under equilibrium conditions between the honeycomb body and the coating dispersion. The method of the invention is characterized in that the honeycomb body is introduced into a vertical immersion chamber with the same shape and provided in the interior with at least one inflatable seal. After the sealed condition is produced, the dispersion is pumped into the immersion chamber from below. Then the dispersion is pumped out again after a dwell time and the honeycomb body freed, after loosening of the seal. The honeycomb is removed from the immersion chamber and is freed of excess dispersion by means of blowing it out or removing it by suction.

In the process of the invention, the filling time, the filling amount, the dwell time in a flooded state and the pumping-out speed, as well as the time between pumping out and blowing out or removing by suction, are measured in such a manner in accordance with the amount of solid matter to be absorbed, that in order to raise the amount of solid matter, the filling time, the dwell time, the pumping-out time and the time between pumping out and blowing out or removing by suction are increased but the filling amount is reduced. These above described measures can be carried out individually or in any combination.

BRIEF DESCRIPTION OF DRAWINGS

The invention is explained further in the following detailed description with reference made to the drawings and to several embodiments.

FIGS. 1a and 1b are plots of data showing the distribution of solid matter:

FIG. 1a) at the slow filling rate which was previously conventional and

FIG. 1b) at a rapid filling in accordance with the present invention.

DETAILED DESCRIPTION OF INVENTION

The following provides additional details of the invention.

There are possibilities of controlling the absorption of the amounts of solid matter via the following variables during the course of coating a) Filling speed/filling time
b) Filling amount
c) Dwell time
d) Emptying (speed and time)
e) Time between pumping out and blowing out.

The individual parameters exhibit different influencing variables thereby:

a) Filling speed and filling time

The distribution of the solid amount becomes poor in the direction of the channels of the honeycomb at very low filling speeds, that is, very long filling times. An oblique distribution is created with increasing solid-matter concentration from the inflow side to the exit side. This is traced to the fact that the inflowing dispersion generates a rinsing effect in the lower range which decreases upwards with simultaneous concentration of the dispersion. It is therefore important that the honeycomb body is rapidly filled so that the suction action begins practically simultaneously over the entire channel surface.

When coating different carrier sizes, the pump output and the opening of the filling flap are to be adapted correspondingly. It was found that a filling time of 4–5 seconds for a part that is 152.4 mm in length is advantageous.

b) Filling amount

The filling amount can be regulated via the filling time and the measurement of the charge level. Of the two, the measurement of the charge level is the better method since the same amount of dispersion is pumped essentially always into the honeycomb to be coated. It is best to arrange the immersion chamber in such a manner that the upper front surface of the honeycomb always rests at the same height in the chamber and is flooded over at the same height.

It turned out that unequal solid-matter charges occur when pumping different amounts of dispersion (expressed via the filling time) through honeycombs of the same size. This is documented by the following Test 1.

Test 1:

6 monolithic carriers from one and the same manufacturing batch consisting of cordierite with the dimensions:

| 144.8 × 81.3 × 127 mm | 62 channels/cm² |
|---|---|
| 0.2 mm wall thickness | | were coated with increasing filling times with a γ-Al₂O₃ dispersion and the solid absorption determined. The coating took place under the following conditions:

| δ-Al₂O₃ dispersion: | |
|---|---|
| Density | 1.568 kg/dm³ |
| Visc. | 40–42 cp |
| Temp. | 22.5° C. |
| Dwell time: | 0.5 sec. |
| Evacuation time: | 8.0 sec. |
| End of evacuation to start of blowing out: | 4.0 sec. |
| Duration of coating cycle: | 20.0 sec. |
| Blowing-out pressure: | 150, 140, 130 mbar/temp. 45° C. |

| Carrier weight g | weight after blowing out g | BD wet absorption g | dry weight g | dry absorption g | filling time sec. | solid matter absorbed % |
|---|---|---|---|---|---|---|
| 569 | 952 | 383 | 754 | 185 | 6.7 | 48.30 |
| 569 | 954 | 385 | 755 | 186 | 6.7 | 48.31 |
| 541 | 916 | 375 | 721 | 180 | 7.7 | 48.00 |
| 544 | 913 | 369 | 721 | 177 | 7.7 | 47.97 |
| 543 | 882 | 339 | 703 | 160 | 8.7 | 47.20 |
| 543 | 878 | 335 | 701 | 158 | 8.7 | 47.16 |

As the table shows, the absorption of solid matter decreases with an increase in the filling amounts (expressed by a lengthening of the filling time at the same pump output) and the ratio between solid matter absorbed and water absorbed shifts in favor of the water.

Dwell time

The dwell time is the time between the end of the filling and the start of the pumping out operation. During this time, the honeycomb body stands full of coating dispersion and draws in more water out of the dispersion. The layer located directly on the honeycomb channel wall receives a high concentration of solid matter as a result thereof.

As the absorption capacity of the material of the honeycomb body decreases, the influence of the dwell time also drops. The latter is therefore to be adjusted to the composition of the honeycomb body and to the thicknesses of the channel walls.

Test 2:

Carriers and other parameters correspond to Test 1 (filling time: 6.7 sec.)

| Carrier weight g | weight after blowing out g | BD wet absorption g | dry weight g | BD dry absorption g | holding time sec. | solid matter absorbed % |
|---|---|---|---|---|---|---|
| 550 | 940 | 390 | 735 | 185 | 0.5 | 47.44 |
| 550 | 942 | 392 | 736 | 186 | 0.5 | 47.45 |
| 550 | 955 | 405 | 742 | 192 | 1.0 | 47.41 |
| 550 | 957 | 407 | 743 | 193 | 1.0 | 47.42 |
| 550 | 970 | 420 | 748 | 198 | 2.0 | 47.14 |
| 550 | 967 | 417 | 747 | 197 | 2.0 | 47.24 |

The solid-matter/water system absorbed by the honeycomb body is shifted in favor of the water by the lengthening of the dwell time. However, wet absorption and dry absorption increase noticeably.

d) Pumping out (speed and time)

The emptying of the honeycomb bodies by means of the pumping out step after the dwell time has elapsed also influences the amount of wash coat absorbed. It is a function of the pump capacity and the pumping time.

The pumping-out time was increased gradually in the following test, which is associated with an improved emptying of the channels of the honeycomb. The absorption ability, which was still present, fixed the deposited coating better onto the channel walls of the honeycomb body.

Test 3:

Setting and carriers as in Test 1 (filling time 6.7 sec.)

| Carrier weight g | weight after blowing out g | BD wet absorption g | dry weight g | BD dry absorption g | pumping out time sec. | solid matter absorbed % |
|---|---|---|---|---|---|---|
| 573 | 956 | 383 | 753 | 180 | 8.0 | 47.00 |
| 573 | 959 | 386 | 744 | 171 | 8.0 | 44.30 |
| 557 | 937 | 380 | 738 | 181 | 9.0 | 47.63 |

-continued

| Carrier weight g | weight after blowing out g | BD wet absorption g | dry weight g | BD dry absorption g | pumping out time sec. | solid matter absorbed % |
|---|---|---|---|---|---|---|
| 558 | 950 | 392 | 744 | 186 | 9.0 | 47.45 |
| 573 | 968 | 395 | 701 | 188 | 10.0 | 47.60 |
| 575 | 990 | 415 | 775 | 200 | 10.0 | 48.19 | e) Time between pumping out and blowing out

The time between the pumping out and the subsequent blowing free or freeing by means of suction likewise affects the absorption of solid matter. This is all the more so when the preceding steps are carried out very rapidly and when there is a distinct short fall in reaching the saturation by means of water absorption.

The influence was investigated in Test 4: Carriers and setting as in Test 1 (filling time 6.7 sec.)

| Carrier weight g | weight after blowing out g | BD wet absorption g | dry weight g | BD dry absorption g | pause time sec. | solid matter absorbed % |
|---|---|---|---|---|---|---|
| 570 | 953 | 383 | 753 | 183 | 4.0 | 47.78 |
| 572 | 956 | 384 | 756 | 184 | 4.0 | 47.92 |
| 573 | 952 | 379 | 755 | 182 | 4.0 | 48.02 |
| 573 | 963 | 390 | 760 | 187 | 6.0 | 47.92 |
| 574 | 966 | 392 | 762 | 188 | 6.0 | 47.98 |
| 572 | 957 | 385 | 757 | 185 | 6.0 | 48.03 |
| 571 | 968 | 397 | 762 | 191 | 8.0 | 48.10 |
| 570 | 965 | 395 | 760 | 190 | 8.0 | 48.09 |
| 568 | 967 | 399 | 760 | 192 | 8.0 | 48.08 |

The amount of dispersion still in the channels after the pumping out operation also exerts an influence. This influence is a function of the pumping-out time and of the installed pump capacity (in Test 4 the emptying pump had a theoretical capacity of 3 m³/h).

Figure 1A:
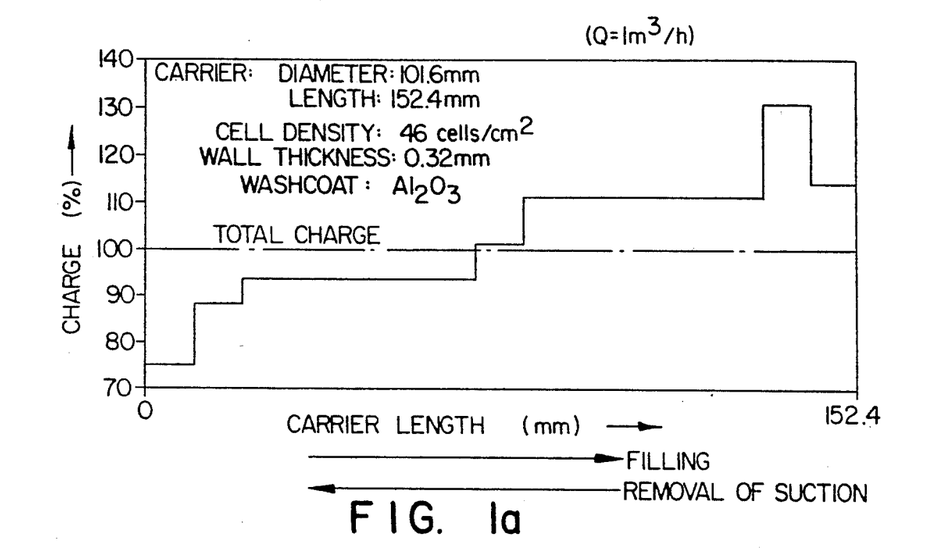
Figure 1B:
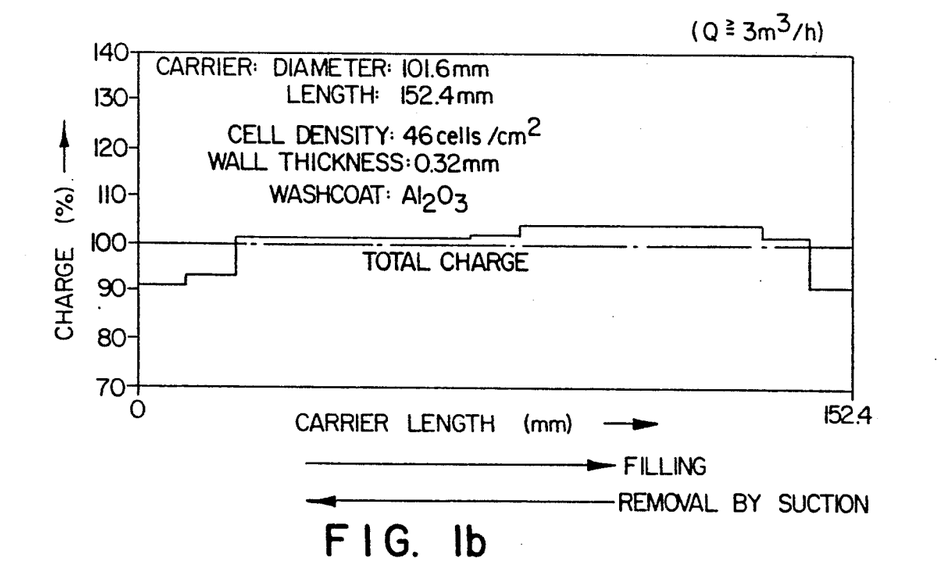

FIGS. 1a and 1b show plots of the distribution of solid matter on a carrier when a slow filling rate is used (Q=1 m³ per hour; FIG. 1a) and when the rapid filling rate is used in accordance with the invention (Q=3 m³ per hour; FIG. 1b). In each of the tests in FIGS. 1a and 1b, an alumina wash coat (Al₂O₃) was applied to a carrier having a diameter of 101.6 mm, a length of 152.4 mm, a cell density of 46 cells/cm², and a wall thickness of 0.32 mm.

Figure 2:
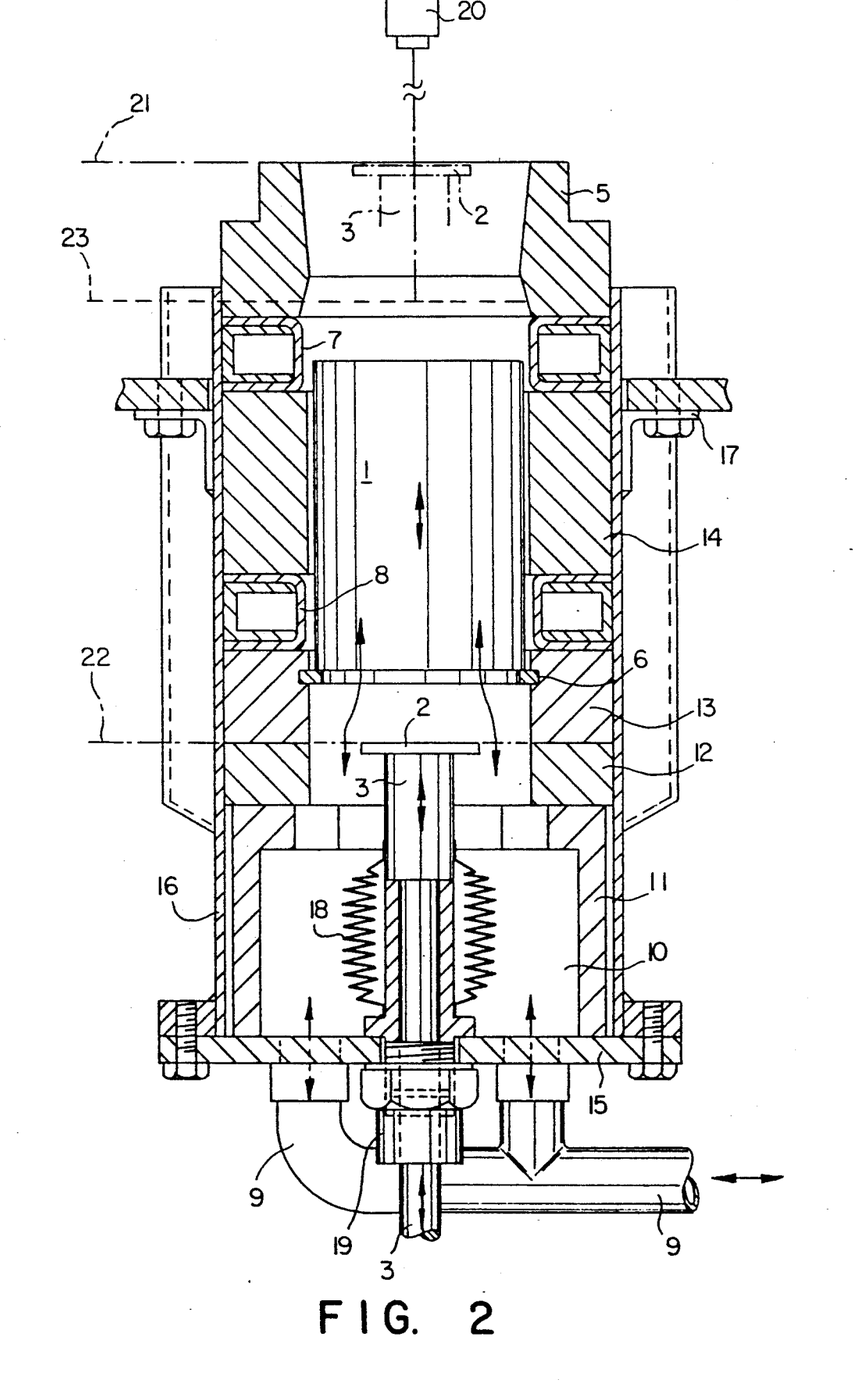
FIG. 2 is a cross-section of the apparatus used for carrying out the present invention.

The immersion chamber used in the coating method of the present invention exhibits the following design according to FIG. 2:

A rectangular, vertically standing immersion-chamber housing 16 is connected to a rectangular base plate 15 with slightly greater dimensions than the cross section of the immersion-chamber housing. The base plate has a central bore 151 into which a slide bushing 19 is screwed which is protected by bellows 18. The bushing is adapted to receive a plunger 3 which can travel up and down. In addition, filling and emptying line 9 is connected to and passes through the base plate. The plunger shaft carries a support plate 2 for the honeycomb body on its upper end. A rectangular inner housing 11 with an inwardly projecting, upper annular edge is inserted flush into the housing and forms the so-called permanent lower immersion-chamber insert. It defines the drain space 10.

A plurality of replacement inserts 12, 13, 14 can be placed on inner housing 11 which designed as an insert. The inserts have the form of disks with a slightly greater opening width than the diameter of honeycomb body 1 (shown in position) so that they quasi form the interior cylinder wall for the reciprocating honeycomb body. The disk thickness and the number of replacement inserts depend on the length of the particular honeycomb bodies to be coated. The lower and upper sections of a given honeycomb body are fixed by inflatable rubber sleeves 7,8 inserted into immersion-chamber housing 16. The outer sleeve form corresponds to the immersion-chamber and the inner sleeve form corresponds to the carrier form. A spring washer 6 resting on replacement insert 13 is inserted underneath rubber sleeve 8 as a support piece for the honeycomb body. An annular fitting 5 arranged above the sleeve functions as the immersion-chamber head 5.

Immersion-chamber housing 16 is suspended by conventional support means at 17 on a carrier frame. Bellows 18 protects the slide connection plunger 3 / slide bushing 19 from penetration by the coating suspension.

A central light chamber 20 located above the honeycomb body outside of the immersion-chamber head serves to measure the level of filling. The lower position of the plunger is denoted by line 22, the upper position by line 21. The line 23 indicates a possible filling level of the immersion-chamber.

The functional operation of the immersion-chamber is as follows:
Plunger 3 travels to the upper position 21.
Carrier 1 is placed on receiving plate 2 of the plunger.
Plunger 3 travels to the lower position 22.
Carrier remains standing on support piece 6.
Upper sleeve 7 and lower sleeve 8 are inflated.
Supply of dispersion via line 9 begins with full capacity of the filling pump or with full opening of the filling valve.
Filling time 1 expires.
Dispersion supply 9 is operated further with choked output
Filling time 2 expires.
Light chamber 20 cuts off supply upon attainment of level of filling 23.
Dwell time expires.
Lower sleeve 8 and upper sleeve 7 are deflated and emptying pump starts up.
Emptying time 1 expires.
Lower sleeve 8 is inflated.
Emptying time 2 expires.
Lower sleeve 8 is deflated;
Upper sleeve 7 is inflated.
Plunger 3 travels upward and pushes honeycomb body 1 by means of receiving plate 2 through the upper sleeve (the adhering wash coat is wiped off thereby on the carrier jacket).
Plunger 3 reaches upper position 21.
Upper sleeve 7 is deflated.
Emptying pump is disengaged.
Carrier part is removed and blown out or removal by suction performed.

EXAMPLE 1

A ceramic carrier body of cordierite (Corning Glass company) with the dimensions:

| Diameter: | 101.6 mm |
|---|---|
| Length: | 152.4 mm |
| Cell density: | 42 cells per cm² |

-continued

| | |
|---|---|
| Wall thickness: | 0.31 mm | was coated with wash coat in a single stage in the immersion-chamber.

The wash coat exhibited the following properties:

| | |
|---|---|
| Concentration: | 48.7% by weight oxides (oxide composition: 84.92% by weight $Al_2O_3$, 5.30% by weight $CeO_2$, 6.82% by weight $ZrO_2$, 2.96% by weight $Fe_2O_3$) |
| Viscosity: | 50 cp |
| Temp.: | 30° C. |
| Particle size: | 0 4–5 μm. |

Setting of the immersion-chamber:

| | |
|---|---|
| Filling time 1:1.5 sec. | Filling-flap position 100% 4.8 sec. |
| Filling time 2:3.3 sec. | Filling-flap position 20% |
| Dwell time: | 0.0 sec. |
| Emptying time 1: | 1.5 sec. |
| Emptying time 2: | 2.5 sec. |
| Ejection: | 0.8 sec. |
| Sleeve pressure above (7): | 2.0 bars |
| Sleeve pressure below (8): | 4.0 bars |
| Time until blowing out: | 2.5 sec. |
| Blowing-out pressure: | 150 mbars |
| Blowing-out time: | 13 sec. |

The coated carrier part was dried 0.5 h with a 150° C. air current and then tempered 1 h at 500° C.

Figure 3:
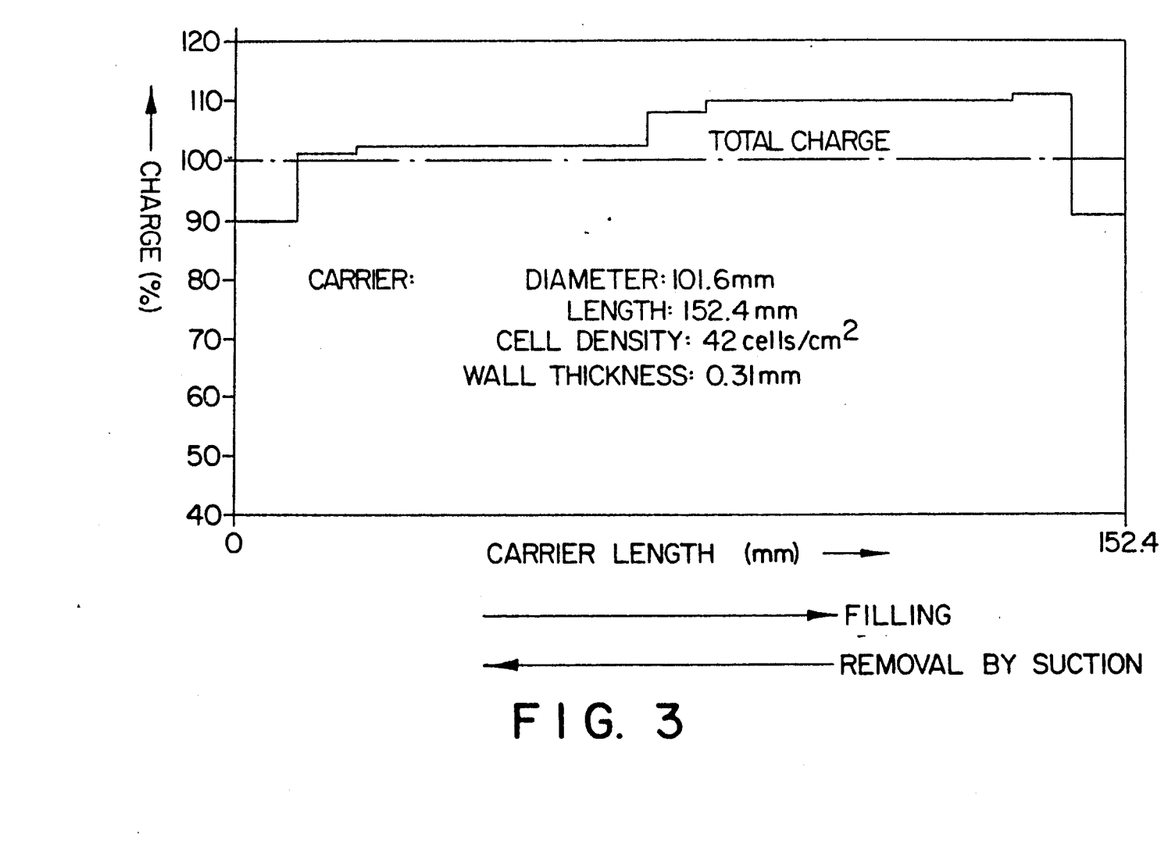
FIG. 3 is a plot of data showing the longitudinal distribution of the wash coat which was achieved in Example 1.

The carrier part had a deposit of 150 g wash coat after tempering. The longitudinal distribution is shown in FIG. 3.

EXAMPLE 2

A metallic carrier (Behr company) with the dimensions:

| | |
|---|---|
| Diameter: | 90.0 mm |
| Length: | 74.5 mm |
| Cell density: | 62 cells per cm² |
| Wall thickness: | 0.05 mm | was coated with wash coat in a single stage in the immersion-chamber.

The wash coat used exhibited the following properties:

| | |
|---|---|
| Concentration: | 56.3% by weight oxides (oxide composition: 77% by weight $Al_2O_3$, 13% by weight $CeO_2$, 7% by weight $ZrO_2$, 3% by weight $Fe_2O_3$) |

Setting of the immersion-chamber:

| | |
|---|---|
| Filling time 1: | 1.8 sec. |
| Filling time 2: | 1.2 sec. |
| Dwell time: | 0.0 sec. |
| Emptying time 1 | 4.0 sec.* |
| Emptying time 2 | |
| Ejection: | 0.6 sec. |
| Sleeve pressure above (7): | 4.0 bars |
| Sleeve pressure below (8): | 4.0 bars |
| Time until blowing out: | 1.5 sec. |
| Blowing-out pressure: | 100 mbars |
| Blowing-out time: | 8 sec. |

*A wiping off of the wash coat from the jacket is not necessary in the case of these parts. The sleeve control has been modified in relation to Example 1. After expiration of the dwell time, both sleeves remain closed and open simultaneously with the start of the ejection.

The coated part was dried standing in an air current 0.5 h in a belt drier at 150° C. and then tempered 0.33 h at 300° C.

The absorption of wash coat, determined after tempering, was 82 g.

The carrier part was coated very cleanly as determined optically. A determination of the wash-coat distribution took place only in a radial direction according to the drawings, FIG. 4.

Figure 4:
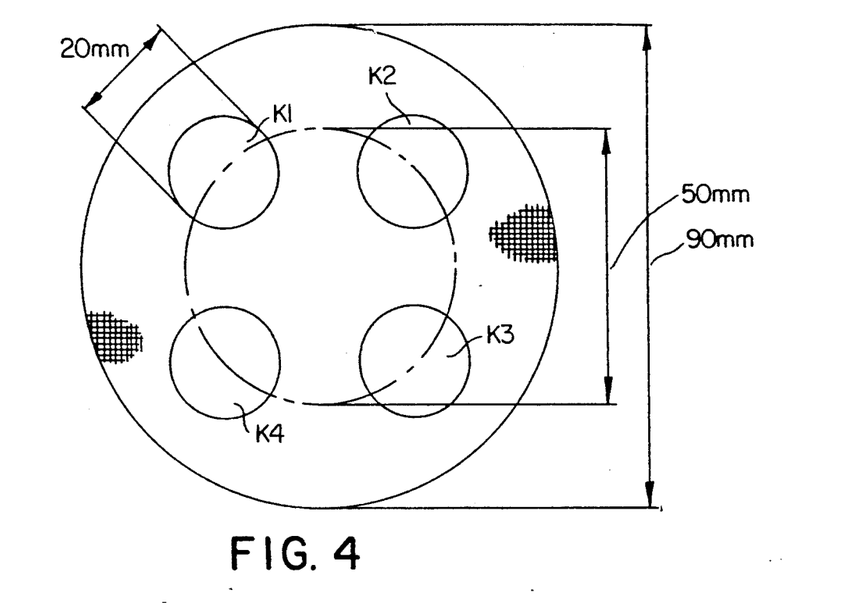
FIG. 4 is a schematic cross-section of a portion of a honeycomb showing the radial distribution of wash coat achieved in Example 2.

Coating result in % in the total charge:
K 1 = 101.4%
K 2 = 99.6%
K 3 = 99.9%
K 4 = 100.3%.

The equipartition in a radial direction is very good.

EXAMPLE 3

A ceramic carrier body of mullite (NGK company) with the dimensions:

| | |
|---|---|
| Length: | 150 mm |
| Width: | 150 mm |
| Height: | 150 mm |
| Cell density: | 8 cells per cm² |
| Wall thickness: | 0.62 mm | was coated with wash coat in a single stage in the immersion-chamber.

The wash coat exhibited the following properties:

| | |
|---|---|
| Concentration: | 64.2% by weight oxides (87% by weight $Al_2O_3$, 6% by weight $CeO_2$, 7% by weight $ZrO_2$) |
| Viscosity: | >100 cp |
| Temp.: | 30° C. |
| Particle size: | 0 8 μm. |

Setting of the immersion-chamber:

| | |
|---|---|
| Filling time 1: | 4 sec. |
| Filling time 2: | 6 sec. |
| Dwell time: | 0.5 sec. |
| Emptying time 1 | 1.5 sec. |
| Emptying time 2 | 8.0 sec. |
| Ejection: | 0.7 sec. |
| Sleeve pressure above (7): | 0.8 bar |
| Sleeve pressure below (8): | 1.5 bars |
| Time until blowing out: | 3.0 sec. |
| Blowing-out pressure: | 150 mbars |
| Blowing-out time: | 14 sec. |

The coated part was dried standing in an air current 1 h in a belt drier at 180° C. and then tempered 0.5 h at 240° C.

The absorption of wash coat, determined after tempering, was 402 g.

Figure 5:
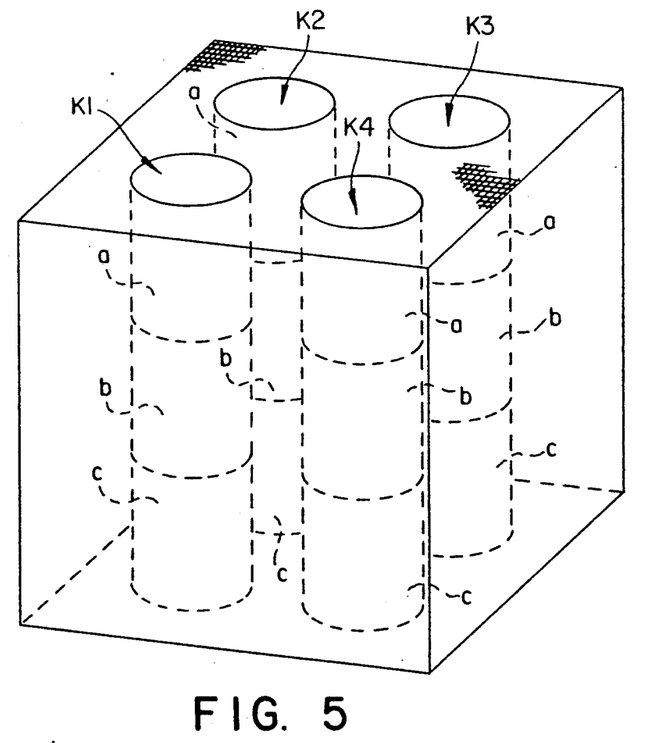
FIG. 5 is a partial perspective view of a section of a honeycomb showing the surface distribution of the wash coat achieved in Example 3.

The distribution of wash coat can be seen in FIG. 5; it is very uniform in all directions.

Surfaces measured on core 1–core 4 (in m²/g):

|   | Core 1 | Core 2 | Core 3 | Core 4 |
|---|---|---|---|---|
| a | 16 | 16 | 16 | 16 upper third |
| b | 16 | 17 | 16 | 17 middle third |
| c | 17 | 16 | 17 | 16 lower third |

EXAMPLE 4

A ceramic carrier body of cordierite (Corning Glass company) with the dimensions:

| Length: | 160 mm |
|---|---|
| Width: | 169.7 mm |
| Height: | 80.8 mm |
| Cell density: | 62 cells per cm$^2$ |
| Wall thickness: | 0.16 mm | was coated with wash coat in a single stage in the immersion-chamber.

The wash coat exhibited the following properties:

| Concentration: | 58.05% by weight oxides (oxide composition: 72% by weight Al$_2$O$_3$, 26% by weight CeO$_2$, 2% by weight ZrO$_2$) |
|---|---|

Setting of the immersion-chamber:

| Filling time 1: | 2.5 sec. |
|---|---|
| Filling time 2: | 3.0 sec. |
| Dwell time: | 0.0 sec. |
| Emptying time 1 | 2.0 sec. |
| Emptying time 2 | 2.0 sec. |
| Ejection: | 0.6 sec. |
| Sleeve pressure above (7): | 1.0 bar |
| Sleeve pressure below (8): | 3.0 bars |
| Time until removal by suction: | 2.5 sec. |
| Suction vacuum: | 400 mbars (negative pressure) |
| Suction time 1: | 7.0 sec. |
| Pause time: | 3.0 sec. |
| Suction time 2: | 9.5 sec. |

The carrier part treated by suction was dried by standing in an air current 0.5 h in a belt drier at 150° C. and then tempered 1 h at 500° C.

The absorption of wash coat, determined on the tempered part, was 296 g.

Figure 6:
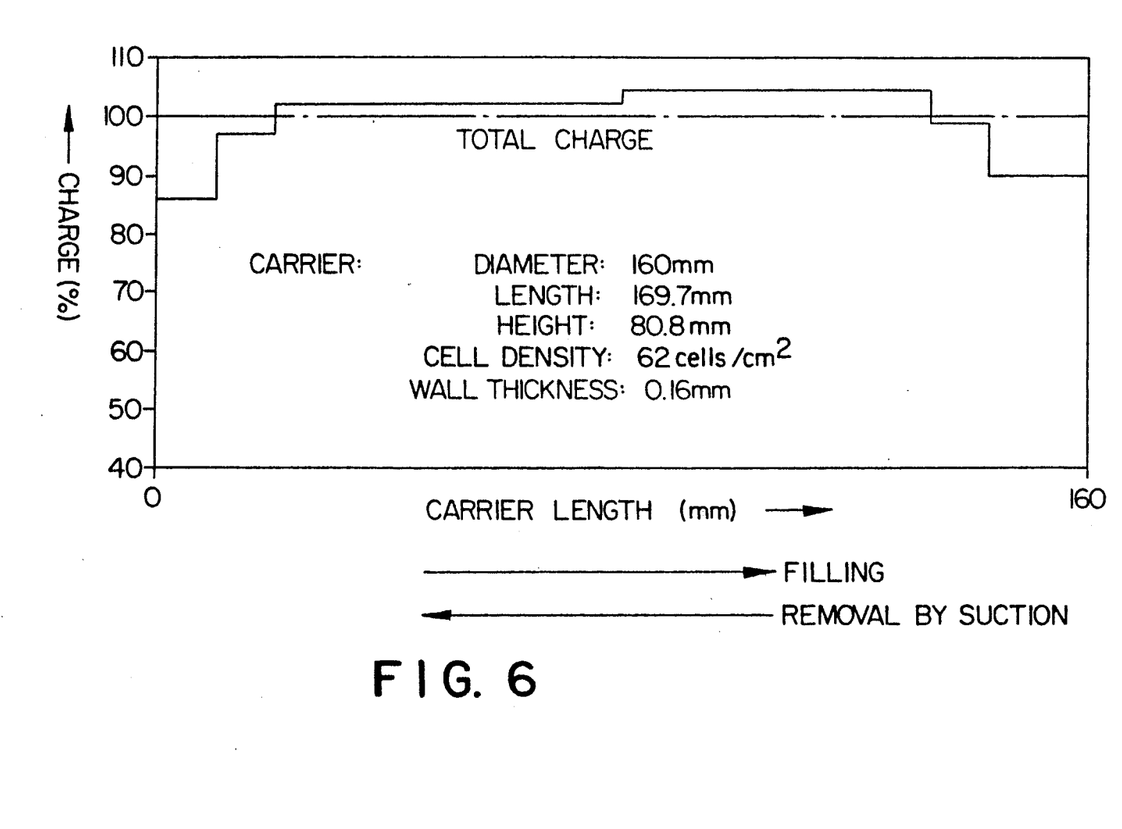
FIG. 6 is a plot of data showing the longitudinal distribution of wash coat achieved in Example 4.

The distribution of wash coat in the longitudinal direction is shown in FIG. 6.

EXAMPLE 5

A process comparison with a rather large number of ceramic carrier bodies of the Corning Glass company was carried out:

| Diameter: | 101.6 mm |
|---|---|
| Length: | 152.4 mm |
| Cell density: | 42 cells/cm$^2$ |
| Wall thickness: | 0.31 mm. |

The oxide coating applied had the following composition:

| Al$_2$O$_3$ | 86.0% |
|---|---|
| CeO$_2$: | 6.3% |
| ZrO$_2$: | 5.4% |
| Fe$_2$O$_3$: | 2.3% |

Nominally, 154±23 g of wash coat should be deposited per carrier part.

Figure 7:
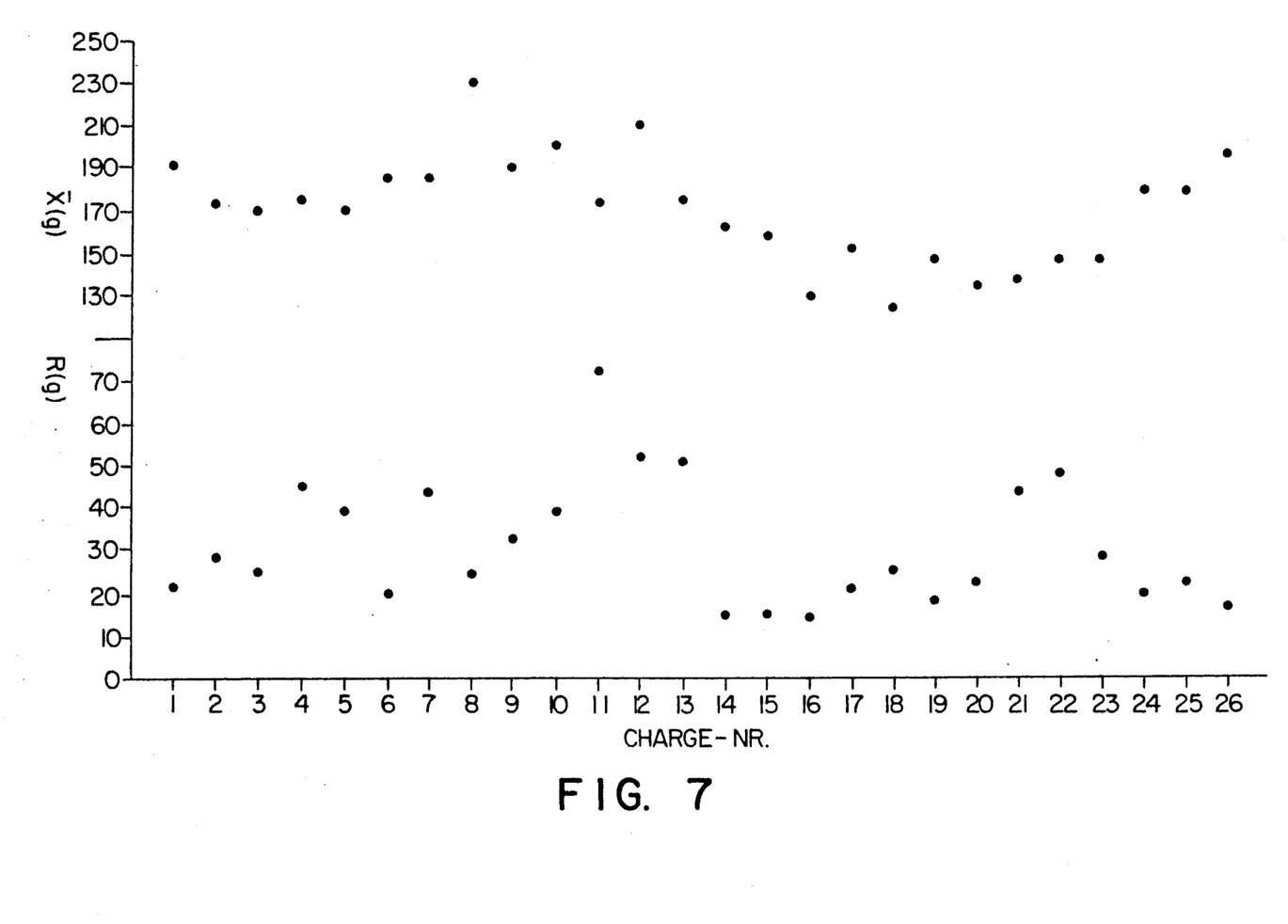
FIG. 7 is a presentation of data showing the average values of the absorption of wash coat obtainable in Example 5 using the previous method of operation with a rather large number of honeycomb bodies.
Figure 8:
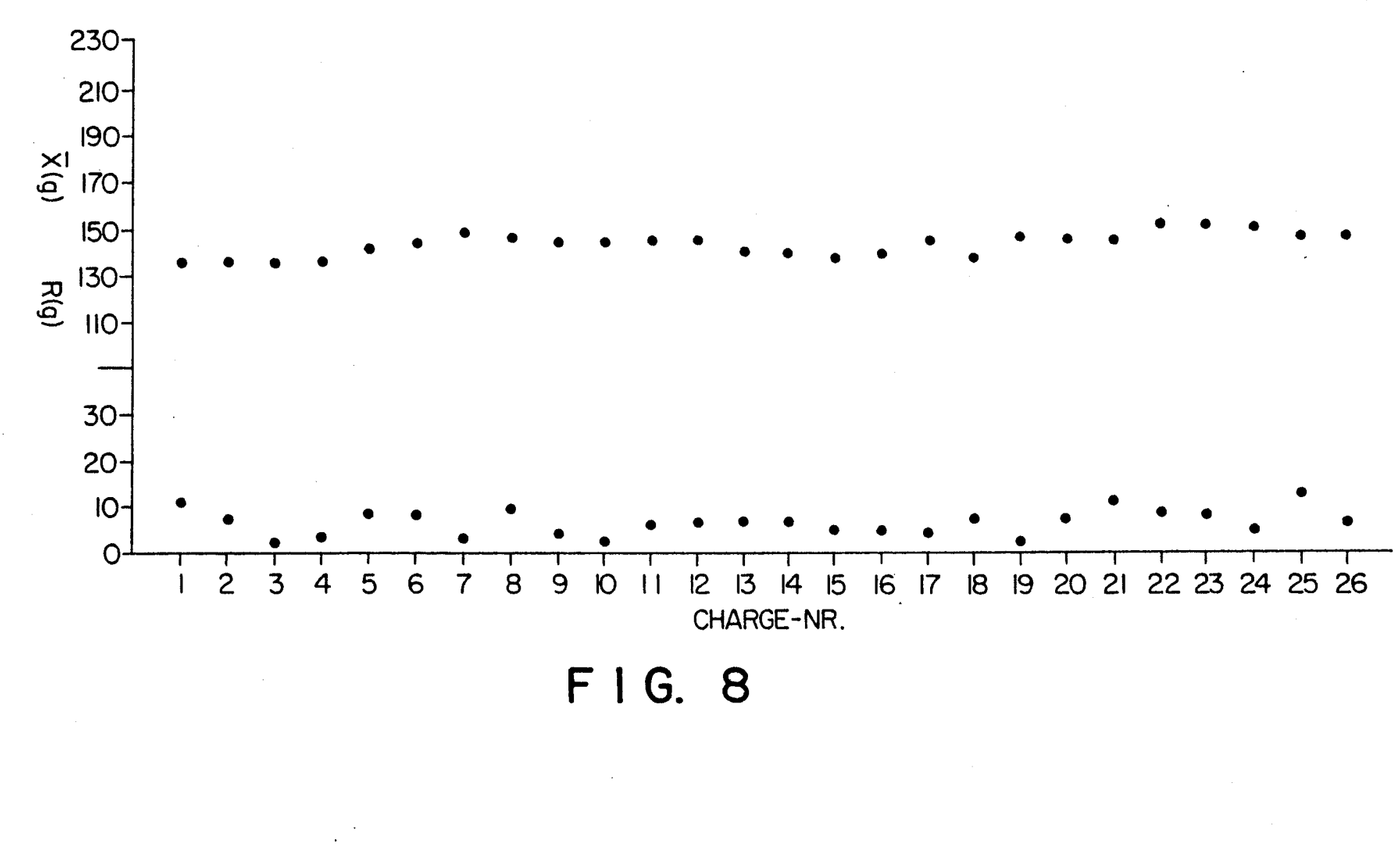
FIG. 8 is a presentation of data showing the average values of the distribution of wash coat obtainable in Example 5 using the method of operation of the invention with a rather large number of honeycomb bodies.

| Amounts and conditions: | traditional FIG. 7 | according to the invention FIG. 8 |
|---|---|---|
| N = | 2,600 pieces | 2,600 pieces |
| n = | 104 pieces | 104 pieces |
| Conc. g % = | 42.2–43.8 | 46.76–47.17 |
| Viscosity cp = | 38–42 | 49–55 |
| No. of immersion steps = | 2 | 1 |
| Charge size: | 100 pieces | |
| Specimens per charge = | 5 pieces | |

FIGS. 7 and 8, show data relating to the average value of the absorption of the wash coat (X(g)) from Example 5, and the scatter of the individual values (R(g)). FIG. 7 shows this data for a previous method of operation, and FIG. 8 shows this data for the method in accordance with the invention.

In the case of the traditional amounts and conditions, the production was characterized by sharp fluctuations of the average value of the absorption and also by scatterings of the individual values which scatterings were just as great:

Process capacity = cp value < 1.0.

In the case of the coating process in accordance with the invention, a uniform course of the average value with low scatter resulted:

Good process capacity = cp value > 2.0.

cp value

The cp performance index represents a relation between the process performance and the specification tolerances.

$$cp = \frac{\text{upper specification limit} - \text{lower specification limit}}{6\hat{\sigma}}$$

$$cp = \frac{USL - LSL}{6\hat{\sigma}}$$

$\hat{\sigma}$ = standard deviation

| cp value | interpretation |
|---|---|
| <1.00 | poor, process necessarily also produces rejected material |
| 1.00–1.33 | barely acceptable |
| 1.34–2.00 | good, justifies continues attempts at improvement |
| >2.00 | excellent, goal to be striven for on a long-term basis |

Further variations and modifications of the foregoing will be apparent to those skilled in the art and are intended to be encompassed by the claims appended hereto German priority applications P 40 06 205.8 and P 40 40 150.2 are relied on and incorporated by reference.

We claim:

1. A method for uniformly coating a honeycomb body made of ceramic or metal with a coating dispersion material of a given constant density resulting in an amount of absorbed solid material which is below an amount which would result from equilibrium between the coating dispersion material and the honeycomb body, comprising: introducing the honeycomb body into an immersion chamber, wherein the immersion chamber conforms its shape to the honeycomb body and is provided in its interior with at least one inflatable sleeve; inflating the sleeve; pumping the dispersion material into the immersion chamber from below the honeycomb body; pumping out the dispersion material after a dwell time; deflating the sleeve; removing the honeycomb body from the immersion chamber; freeing the honeycomb body from excess dispersion material by blowing out or by removing the excess dispersion material by suction, whereby a filling time, a filling amount, the dwell time, a pumping out time and a time between pumping out and blowing out or suction are selected such that in order to raise the amount of absorbed solid material, at least one of the filling time, the dwell time, the pumping out time and the time between pumping out and blowing out or suction are increased or the filling amount is decreased.

2. The method according to claim 1, wherein the interior of the immersion chamber includes two inflatable sleeves.

3. The method according to claim 1, wherein the filling time is in the range of 3 to 10 seconds.

4. The method according to claim 1, wherein the dwell time is in the range of 0 to 2 seconds.

5. The method according to claim 1, wherein the pumping out time is in the range of 4 to 10 seconds.

6. The method according to claim 1, wherein the time between pumping out and blowing out or suctioning out is in the range of 1.5 to 8 seconds.

7. The method according to claim 1, wherein the blowing out time is in the range of 8 to 14 seconds.

8. The method according to claim 1, wherein the suction time is 16.5 seconds.

9. A method for coating an object with a coating dispersion material resulting in coating an amount of absorbed solid material which is below an amount which would result from equilibrium between the coating dispersion material and the object comprising:
  placing the object to be coated on a surface located at an upper position in an immersion chamber;
  moving the object to a lower position in the immersion chamber;
  inflating at least one inflatable sleeve;
  supplying the immersion chamber with a dispersion material for coating onto the object;
  waiting for a first filling time to expire;
  choking an output while continuing to supply dispersion material;
  waiting for a second filling time to expire, whereby the first filling time and the second filling time combine to give a total filling time;
  stopping the supply of dispersion material after a predetermined amount of dispersion material has been supplied;
  waiting for a dwell time to expire;
  deflating the inflatable sleeve;
  emptying the immersion chamber over an emptying time; and
  at a time after emptying, removing excess dispersion material from the object,
  whereby the total filling time, the dwell time, the dispersion material amount, the emptying time, and the time between emptying and the removing of the excess dispersion material from the object are selected such that in order to raise an amount of coating material absorbed by the object, any one or more of the total filling time, the dwell time, the emptying time, and the time between emptying and the removed of the excess dispersion material are increased, or the dispersion material amount is decreased.

10. The method according to claim 9, wherein after the object is moved into the lower position in the immersion chamber, the object rests on a support piece at the lower position in the immersion chamber and the surface on which it is moved continues to be moved to a further lower position.

11. The method according to claim 9, wherein the immersion chamber includes an upper inflatable sleeve and a lower inflatable sleeve.

12. The method according to claim 11, wherein during the inflating step, both the upper and the lower inflatable sleeves are inflated.

13. The method according to claim 11, wherein during the deflation step, both the upper and lower sleeves are deflated prior to the beginning of the emptying step.

14. The method according to claim 13, wherein the emptying step takes place with the use of an emptying pump.

15. The method according to claim 13, wherein the emptying step includes the following steps:
  emptying a portion of the chamber during a first emptying time;
  inflating the lower inflatable sleeve;
  continue emptying for a second emptying time;
  deflating the lower inflatable sleeve; and
  inflating the upper inflatable sleeve.

16. The method according to claim 9, wherein before the removing step, the following additional steps are carried out:
  inflating the upper inflatable sleeve; and
  pushing the object through the upper inflatable sleeve to thereby wipe coating material off of the object.

17. The method according to claim 9, wherein the supplying sleeve is performed by activating a filling pump or by opening a filling valve.

18. The method according to claim 9, wherein the removing step is accomplished by blowing out the excess dispersion material or by suctioning out the excess dispersion material.

19. The method according to claim 9, wherein the total filling time is in the range of 3 to 10 seconds.

20. The method according to claim 9, wherein the dwell time is in the range of 0 to 2 seconds.

21. The method according to claim 9, wherein the emptying time is in the range of 4 to 10 seconds.

22. The method according to claim 9, wherein the time between the emptying step and the removing step is in the range of 1.5 to 8 seconds.

* * * * *